A. H. ACKERMANN.
PROTECTED TERMINAL CLAMPING DEVICE.
APPLICATION FILED MAY 2, 1910.
1,059,326.  Patented Apr. 15, 1913.
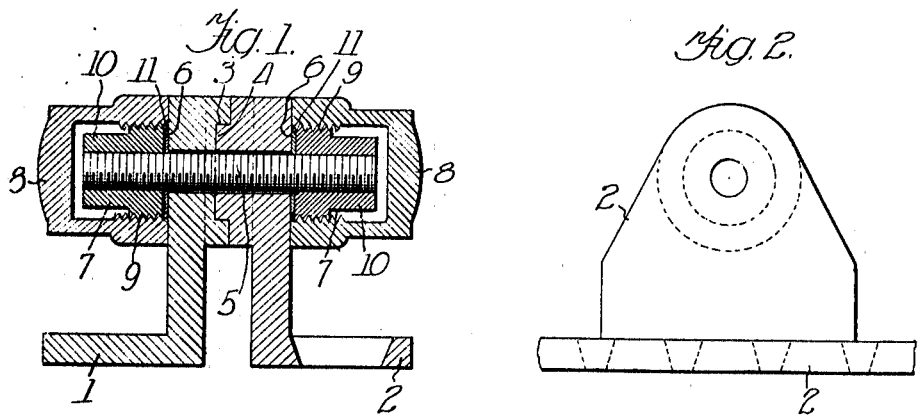
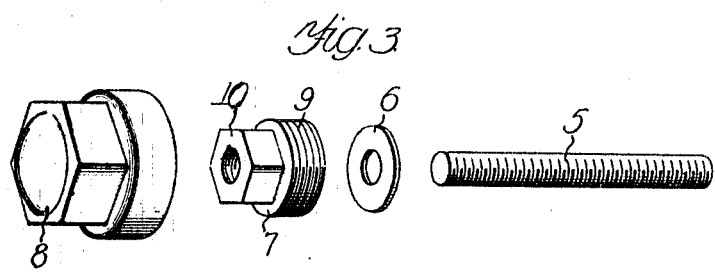
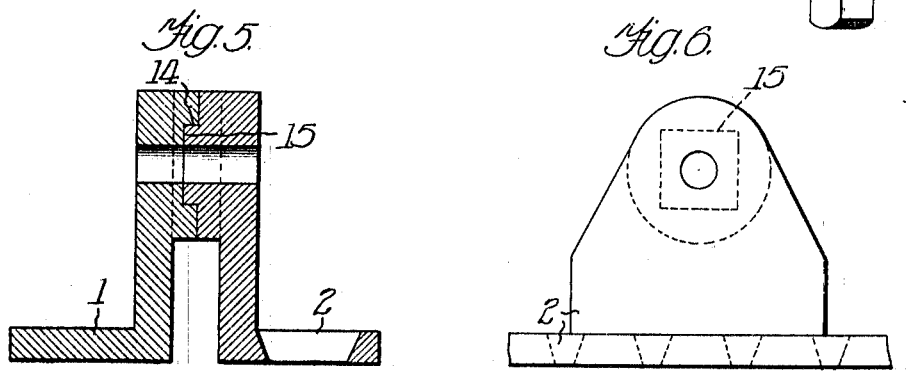
Witnesses:  Inventor:
Robert N. Weir  Alexander Henry Ackermann
Geo. B. Jones.  By Edwin M. H. Towse Jr Atty.

UNITED STATES PATENT OFFICE.

ALEXANDER HENRY ACKERMANN, OF BROOKLYN, NEW YORK, ASSIGNOR TO THE UNITED STATES LIGHT & HEATING COMPANY, OF NEW YORK, N. Y., A CORPORATION OF MAINE.

PROTECTED TERMINAL-CLAMPING DEVICE.

1,059,326. Specification of Letters Patent. Patented Apr. 15, 1913.

Application filed May 2, 1910. Serial No. 559,015.

*To all whom it may concern:*

Be it known that I, ALEXANDER HENRY ACKERMANN, a citizen of the United States, residing at Brooklyn, in the county of Kings and State of New York, have invented new and useful Improvements in Protected Terminal-Clamping Devices, of which the following is a full, clear, concise, and exact description, reference being had to the accompanying drawing, forming a part of this specification.

My invention relates to interfitting storage battery terminals and to the devices for clamping the terminals firmly together, having for its object the provision of means for protecting the clamping devices from the deleterious effect of the acid fumes.

Where the storage battery is made up of a number of individual cells, it often happens, particularly in a case where batteries are to be used in connection with a vehicle, that the individual cells have to be connected or disconnected, the connection always being made in a predetermined manner to insure a series connection. In order to prevent mistakes being made in connecting up the cells, the projecting lead strap or terminal representing one pole of the battery, has thereon a projection or boss, while the other terminal has a complementary recess. The projection on one terminal will fit the recess in the proper terminal of an adjacent cell and no other. The interfitting members are clamped firmly together to insure good electrical contact.

The improved clamping means may take any one of a number of suitable forms and is shown in the accompanying drawing as a screw-threaded stud of brass or other good conducting material of considerable strength having, preferably, conducting nuts of brass and washers of antimonious lead on each end. In order to protect the brass or other metal of good conductivity from the corroding action of the acid fumes and spray, protecting caps of metal unaffected by the acid, are provided for each nut, which caps have screw-threaded engagement therewith and, in conjunction with the lead terminals themselves, completely inclose the brass nuts.

Referring to one of the many practical embodiments of the invention as shown in the accompanying drawings:—Figure 1 is a central section of the improved clamping means. Fig. 2 is an end view of the preferred form of terminal. Fig. 3 shows in perspective, the threaded stud, washer, nut and cap. Fig. 4 is a modified form of connecting nut. Fig. 5 is a section of a modified form of interfitting terminal. Fig. 6 is an end view thereof.

In the preferred form, the terminals 1, 2, have interfitting portions consisting of a circular recess 3 and a boss 4. A screw-threaded stud 5, having on its ends washers 6 and nuts 7, serves to maintain the parts in clamped relation. The stud and nuts are made of metal of considerable strength and of good conductivity, such as brass, and in order to protect said metal from the corroding effects of acid fumes, a cap 8, of lead, antimonious lead, or other suitable material is provided for each end of the stud and completely incloses the parts which would otherwise be exposed.

Each nut 7 has an external screw-threaded portion 9, and a reduced portion 10 of angular section, having faces which may be easily engaged by a wrench. The nuts are of greater diameter than the adjacent washers 6, 6, the result being that when the parts are assembled as in Fig. 1, an annular recess 11 is formed. This recess may be filled with vaseline or other heavy, oily substance, for the purpose of sealing up the joint made by the cap with the terminals. The washers being of antimonious lead or equivalent relatively soft metal, prevent injury to the soft lead straps, by the clamping nuts.

In Fig. 4 is shown a modified form of clamping nut, having the external screw-threaded portion 12, and a plurality of grooves 13, with which a wrench may readily co-act for tightening the nut on the stud. With this form there is used an ordinary nut which acts as a lock nut. This lock nut being of smaller diameter than the clamping nut, does not interfere with the use of a protecting cap similar to 8 in Fig. 3.

In Figs. 5 and 6 is shown a modification of the form of interfitting terminals shown in Figs. 1 and 2. The recess 14 is square and the complementary boss 15 is also square. It is of course obvious that these interfitting portions may be of any suitable outline, and that either the preferred form of nut 7, or the form shown in Fig. 4, may be used with either form of interfitting terminal.

When the parts are assembled as in Fig. 1, it will be apparent that not only is good electrical contact made between the terminals, but that the entire exterior surface is of lead or equivalent material which protects the inclosed parts made of metal of good conductivity and of greater mechanical strength than the lead itself. It is also apparent that the parts may be readily taken apart and assembled.

In the foregoing, the forms described are selected for the purpose of illustration only, and the modifications included are simply suggestive of the many changes which may be made within the scope of the invention, and are not inserted by way of limitation.

Having described my invention, what I claim and desire to secure by Letters Patent of the United States is:—

1. In an acid proof battery terminal connection, in combination, battery terminals having interfitting portions, a conducting stud passing therethrough, a clamping nut on each end of said stud, and removable protecting caps of acid proof material inclosing said nuts and the ends of said conducting stud, said caps being provided with flat faces adjacent the battery terminals, whereby a close fit may be provided between each cap and its respective terminal and injurious grooving of the terminals avoided.

2. In an acid proof battery terminal connection, in combination, battery terminals having interfitting portions, a conducting stud passing therethrough, a clamping device on each end of said stud, and a removable protecting cap of acid proof material screw-threaded upon each of said clamping devices, said caps being formed of soft metal and being provided with flat faces adjacent the battery terminals, whereby a close fit may be provided between the caps and terminals and injurious grooving of the terminals avoided.

3. In combination, battery terminals having interfitting portions, a conducting stud passing through said portions, a conducting washer and nut on each end of said stud, said washers being of smaller diameter than the adjacent portions of said nuts, whereby an annular groove is formed when the parts are assembled in clamped relation, said nuts having an externally screw-threaded portion, protecting caps of acid-proof material removably secured to said screw-threaded portion and a filling of oily material in said annular groove.

4. In a battery terminal connection, in combination, lead terminal members having interfitting contact faces, a conducting stud and conducting nuts thereon for effecting good mechanical and electrical contact between said faces, and washers of antimonious lead between said nuts and the corresponding terminal members.

In witness whereof, I have hereunto subscribed my name in the presence of two witnesses.

ALEXANDER HENRY ACKERMANN.

Witnesses:
W. P. HAWLEY,
GEO. MUELLER.